(12) United States Patent
Lee et al.

(10) Patent No.: US 10,564,328 B2
(45) Date of Patent: Feb. 18, 2020

(54) CLOAKING DEVICES WITH HALF LENSES AND PLANE MIRRORS AND VEHICLES COMPRISING THE SAME

(71) Applicant: Toyota Motor Engineering & Manufacturing North America, Inc., Erlanger, KY (US)

(72) Inventors: Kyu-Tae Lee, Ann Arbor, MI (US); Debasish Banerjee, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 197 days.

(21) Appl. No.: 15/677,341

(22) Filed: Aug. 15, 2017

(65) Prior Publication Data

US 2019/0056535 A1    Feb. 21, 2019

(51) Int. Cl.
  *G02B 3/00*    (2006.01)
  *B62D 25/04*    (2006.01)

(52) U.S. Cl.
  CPC .......... *G02B 3/0056* (2013.01); *B62D 25/04* (2013.01); *G02B 3/0043* (2013.01); *G02B 2003/0093* (2013.01)

(58) Field of Classification Search
  CPC .......... B60R 1/08; B60R 1/007; B62D 25/04; G02B 3/0043; G02B 3/0056
  USPC .................................... 296/193.06
  See application file for complete search history.

(56) References Cited

U.S. PATENT DOCUMENTS

| 9,405,118 | B1 | 8/2016 | Lu |
| 9,557,547 | B2 | 1/2017 | Choi et al. |
| 9,994,154 | B1* | 6/2018 | Takagi .................. B60R 1/007 |
| 10,161,720 | B2* | 12/2018 | Banerjee .................. F41H 3/00 |
| 2003/0047666 | A1 | 3/2003 | Alden |
| 2015/0183375 | A1* | 7/2015 | Wu ...................... G02B 17/023 359/734 |
| 2017/0227781 | A1* | 8/2017 | Banerjee .............. G02B 27/14 |

FOREIGN PATENT DOCUMENTS

WO    2017007526 A2    1/2017

OTHER PUBLICATIONS

Banerjee, Debasish et al., "Invisibility cloak with image projection capability", Sci. Rep., 6: 38965 (2016).
U.S. Appl. No. 15/435,996, filed Feb. 17, 2017; Inventors: Debasish Banerjee, Chengang Ji, Mayu Takagi.

* cited by examiner

*Primary Examiner* — Joseph D. Pape
(74) *Attorney, Agent, or Firm* — Dinsmore & Shohl LLP

(57) ABSTRACT

A cloaking device includes an object-side, an image-side and a cloaked region between the object side and image-side. An object-side half lens, an image-side half lens and a planar reflection boundary positioned between the object-side half lens and the image-side half lens are included. The object-side half lens and the image-side half lens each comprise an inward facing surface and an outward facing convex surface. The planar reflection boundary comprises an inward facing mirror surface. Light from an object positioned on the object-side of the cloaking device and obscured by the cloaked region is redirected around the cloaked region by the object-side half lens, planar reflection boundary and image-side half lens to form an image of the object on the image-side of the cloaking device such that the light from the object appears to pass through the cloaked region.

20 Claims, 8 Drawing Sheets

CLOAKING DEVICES WITH HALF LENSES AND PLANE MIRRORS AND VEHICLES COMPRISING THE SAME

TECHNICAL FIELD

The present specification generally relates to apparatuses and methods for making an object appear transparent and, more specifically, to cloaking devices for pillars of vehicles and methods for making pillars of vehicles appear transparent.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device includes an object-side, an image-side, a cloaked region between the object-side and the image-side, and a reference optical axis extending from the object-side to the image-side. An object-side half lens and an image-side half lens are included. The object-side half lens and the image-side half lens each comprise an inward facing surface, an outward facing convex surface, a thick end and a thin end. The inward facing surface and the outward facing convex surface extend between the thick end and the thin end. A planar reflection boundary positioned between the object-side half lens and the image-side half lens is included. The planar reflection boundary comprises an inward facing mirror surface oriented parallel to the reference optical axis. Light from an object positioned on the object-side of the cloaking device and obscured by the cloaked region is redirected around the cloaked region by the object-side half lens, planar reflection boundary and image-side half lens to form an image of the object on the image-side of the cloaking device such that the light from the object appears to pass through the cloaked region. In embodiments, the thin ends of the object-side and image-side half lenses are positioned proximal to the reference optical axis and the thick ends of the object-side and image-side half lenses are positioned distal to the reference optical axis. Also, the inward facing mirror surface of the planar reflection boundary may be positioned at a focal point of the object-side half lens. The object-side half lens is oriented to focus light from the object positioned on the object-side of the cloaking device onto the inward facing mirror surface of the planar reflection boundary and the inward facing mirror surface of the planar reflection boundary is oriented to reflect light from the object-side half lens to the image-side half lens. The image-side half lens is oriented to focus light from the inward facing mirror surface of the planar reflection boundary and form the image of the object on the image-side of the cloaking device.

In another embodiment, a cloaking device assembly includes an object-side, an image-side, a cloaked region, a cloaked article positioned within the cloaked region, and a reference optical axis extending from the object-side to the image-side. A pair of object-side half lenses and a pair of image-side half lenses are included and each of the pair of object-side half lenses and each of the pair of image-side half lenses comprise an inward facing surface and an outward facing convex surface. One of the pair of object-side half lenses is positioned on one side of the reference optical axis and one of the pair of object-side half lenses is positioned on another side of the reference optical axis. Similarly, one of the pair of image-side half lenses is positioned on one side of the reference optical axis and one of the pair of image-side half lenses is positioned on another side of the reference optical axis. Each of the pair of object-side half lenses and each of the pair of image-side half lenses comprise a thick end and a thin end, and the inward facing surface and the outward facing convex surface of each of the pair of object-side half lenses and each of the pair of image-side half lenses extend between the thick end and the thin end. The thin end of each of the pair of object-side half lenses and each of the pair of image-side half lenses may be positioned proximal to the reference optical axis and each of the thick ends may be positioned distal to the reference optical axis. In some embodiments, thicknesses of the thick end of each of the pair of object-side half lenses are equal. In other embodiments, thicknesses of the thick end of each of the pair of object-side half lenses are not equal. A pair of planar reflection boundaries is included and each of the pair of planar reflection boundaries comprises an inward facing mirror surface oriented parallel to the reference optical axis. One of the pair of planar reflection boundaries is positioned between the object-side half lens and the image-side half lens positioned on the one side of the reference optical axis and another of the pair of planar reflection boundaries is positioned between the object-side half lens and the image-side half lens positioned on the another side of the reference optical axis. Light from an object positioned on the object-side of the cloaking device assembly and obscured by the cloaked region is redirected around the cloaked article by the pair of object-side half lenses, pair of planar reflection boundaries and pair of image-side half lenses to form an image of the object on the image-side of the cloaking device assembly such that the light from the object appears to pass through the cloaked article.

In another embodiment, a vehicle includes an A-pillar with a cloaking device positioned on the A-pillar. The cloaking device includes an object-side, an image-side, a cloaked region and a reference optical axis extending from the object-side to the image-side. The A-pillar is positioned within the cloaked region, the object-side is positioned on an exterior of the vehicle and the image-side is positioned within an interior of the vehicle. An object-side half lens and an image-side half lens are included. The object-side half lens and the image-side half lens each comprise an inward facing surface, an outward facing convex surface, a thick end and a thin end. The inward facing surface and the outward facing convex surface of the object-side half lens and the image-side half lens extend between the thick end and the thin end thereof. A planar reflection boundary positioned between the object-side half lens and the image-side half lens is included. The planar reflection boundary comprises an inward facing mirror surface oriented parallel to the reference optical axis. Light from an object positioned on the exterior of the vehicle and obscured by the cloaked region is redirected around the A-pillar via propagation of the light through the object-side half lens onto the planar reflection boundary, reflection of the light by the planar reflection boundary onto the image-side half lens and propagation of the light through the image-side half lens. The light forms an image of the object on the exterior of the vehicle within the interior of the vehicle such that the light from the object appears to pass through the A-pillar.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a pair of half lenses and a planar mirror which direct incoming light around a cloaked region. The cloaking devices described herein may utilize half cylindrical lenses, half acylindrical lenses and/or half achromatic lenses in combination with a planar mirror to focus, reflect, diverge and re-focus light from an object. Cloaking devices described herein may be used to cloak vehicle articles such as vehicle A-pillars, B-pillars, C-pillars, D-pillars, etc., and remove a "blind spot" caused by the vehicle article. A blind spot refers to a region of the vehicle where an occupant's view may be obstructed. The utilization of the half lenses and planar mirror allows a driver to perceive an image which, if not for the cloaking device, would be obstructed by a pillar of the vehicle. Various embodiments of cloaking devices and methods for using the same will be described in further detail herein with specific reference to the appended drawings.

Figure 1:
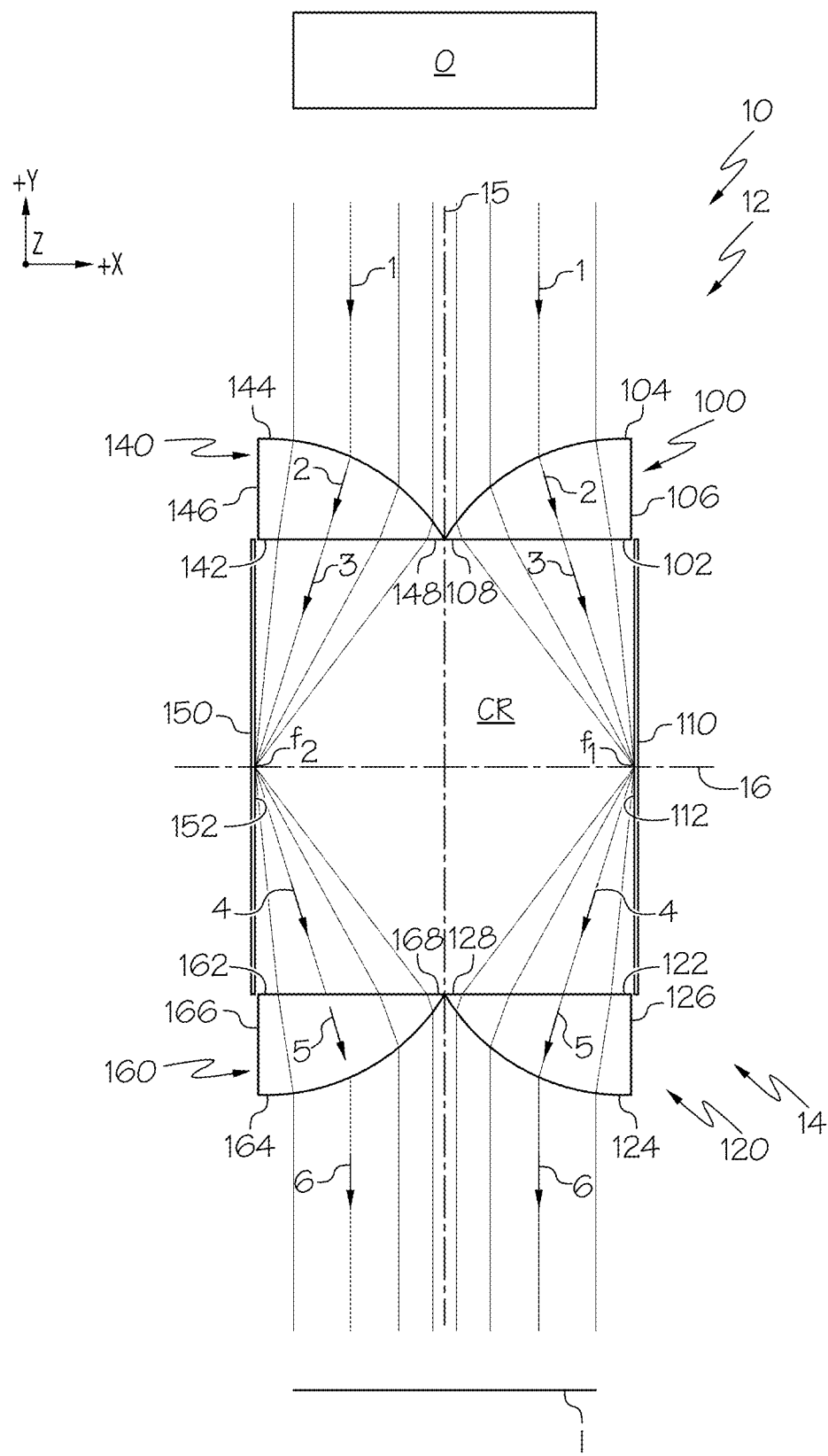
FIG. 1 schematically depicts a top view of a cloaking device according to one or more embodiments disclosed and described herein.

FIG. 1 generally depicts one embodiment of a cloaking device. The cloaking device includes a cloaked region that is at least partially bounded by two half lenses and one planar reflection boundary positioned between the two half lenses. As used herein, the term "half lens" refers to a lens with a reduced length along a direction perpendicular to an optical axis of the lens. The terms "boundaries" and "boundary" refer to a physical surface. One of the half lenses may be an object-side half lens and one of the half lenses may be an image-side half lens. The planar reflection boundary may be positioned between the object-side half lens and the image-side half lens. The object-side half lens and the image-side half lens each have an inward facing surface, an outward facing convex surface, a thick end and a thin end. As used herein the term "inward facing surface" refers to a surface that faces towards or is proximal to the cloaked region and the term "outward facing surface" refers to a surface facing away or distal from the cloaked region. The object-side half lens is oriented to focus incident light from an object positioned on an object-side of the cloaking device onto the planar reflection boundary. The planar reflection boundary is oriented to reflect and diverge the focused incident light from the object-side half lens onto the inward facing surface of the image-side half lens. The image-side half lens is oriented to focus the diverging incident light from the planar reflection boundary and provide an image on the image-side of the cloaking device.

Still referring to FIG. 1, embodiments of a cloaking device include a cloaking assembly 10 with an object-side 12, an image-side 14, and four half lenses 100, 120, 140, 160. A cloaked region CR is positioned between the half lenses 100, 140 and half lenses 120, 160. Each of the four half lenses 100, 120, 140, 160 has a length along the X-axis, a thickness along the Y-axis and a height along the Z-axis of the coordinate axes shown in the figures. That is, the X-axis shown in the figures extends along a length of the four half lenses 100, 120, 140, 160, the Y-axis shown in the figures extends along a thickness of the four half lenses 100, 120, 140, 160, and the Z-axis shown in the figures extends along a height of the four half lenses 100, 120, 140, 160. The two half lenses 100, 140 may be positioned on the object-side 12 of the cloaking assembly 10 to face an object 'O' and may be referred to herein as object-side half lenses 100, 140. The two half lenses 120, 160 may be positioned on the image-side 14 of the cloaking assembly 10 to provide an image 'I' formed by the cloaking assembly 10 and may be referred to herein as image-side half lenses 120, 160.

The half lenses 100, 120, 140, 160 each have an inward facing surface 102, 122, 142, 162 and an outward facing convex surface 104, 124, 144, 164, respectively. Also, the half lenses 100, 120, 140, 160 each have a thick end 106, 126, 146, 166 and a thin end 108, 128, 148, 168, respectively. The inward facing surfaces 102, 122, 142, 162 and outward facing convex surfaces 104, 124, 144, 164 extend between the thick ends 106, 126, 146 166 and thin ends 108, 128, 148, 168, respectively.

Figure 2A:
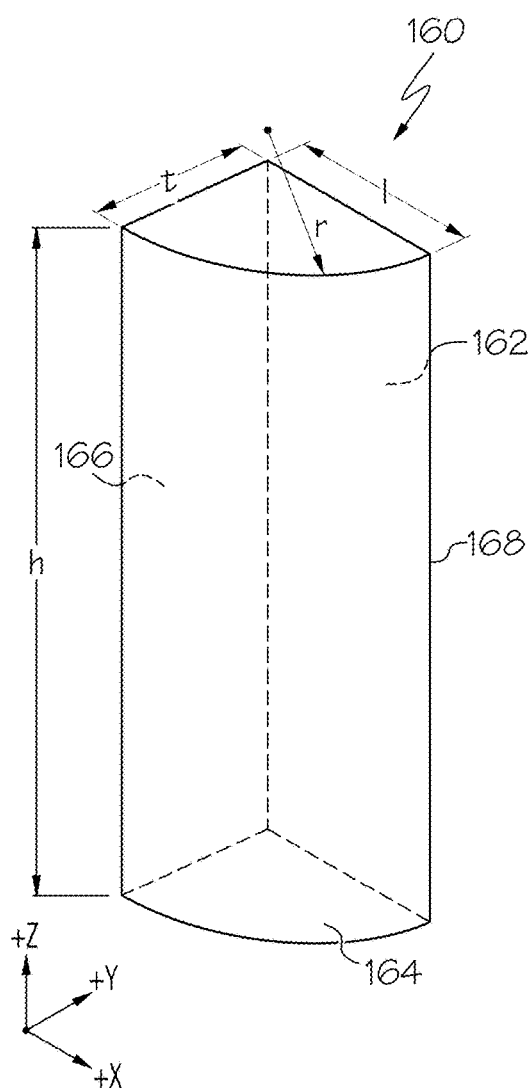
FIG. 2A schematically depicts a half cylindrical lens for a cloaking device according to one or more embodiments disclosed and described herein.
Figure 2B:
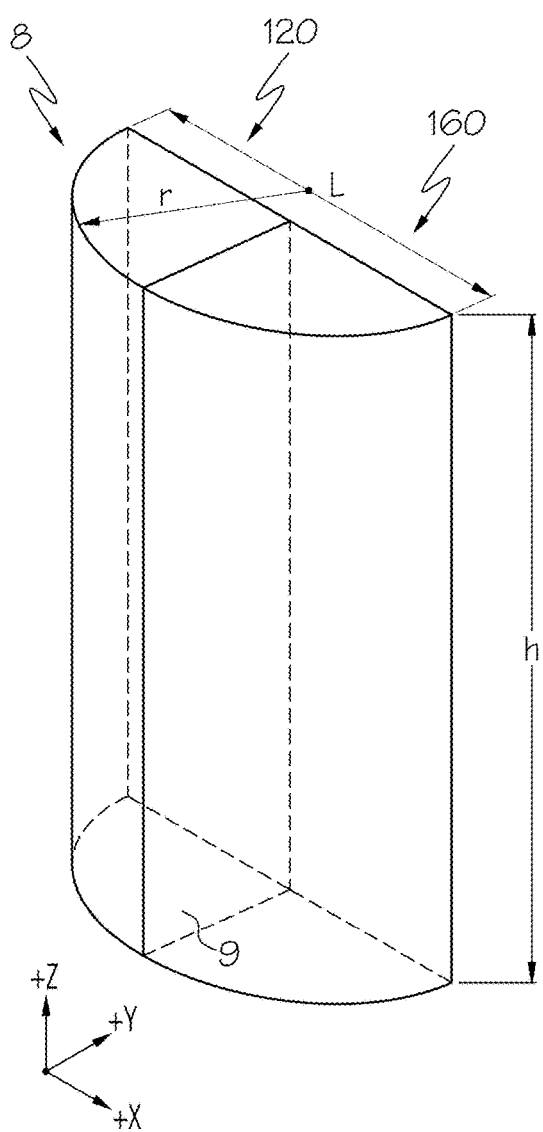
FIG. 2B schematically depicts a pair of half cylindrical lenses formed from a cylindrical lens for a cloaking device according to one or more embodiments disclosed and described herein.

In embodiments, the half lenses 100, 120, 140, 160 may be half cylindrical lenses, half acylindrical lenses, or half achromatic lenses. Also, it should be understood that the half lenses 100, 120, 140, 160 may be a combination of half cylindrical lenses, half acylindrical lenses and/or half achromatic lenses. That is, one or more of the half lenses 100, 120, 140, 160 may be a half cylindrical lens, a half acylindrical lens or a half achromatic lens. An example of a half cylindrical lens 160 is depicted in FIG. 2A. Particularly, the half cylindrical lens 160 includes the inward facing surface 162 and the outward facing convex surface 164. The inward facing surface 162 is an inward facing planar surface and the outward facing convex surface 164 is an outward facing cylindrical surface with a radius 'r'. The inward facing surface 162 and the outward facing cylindrical surface 164 extend between the thick end 166 and the thin end 168. The inward facing planar surface 162 has a length 'l' along the X-direction and the thick end 166 has a thickness 't' along the Y-direction. The half cylindrical lens 160 has a height 'h' and an optical axis (not shown) extending in the Z-direction. In embodiments, the half cylindrical lens 160 may be formed from a cylindrical lens as depicted in FIG. 2B. That is, a cylindrical lens 8 with a length 'L' (X direction) depicted in FIG. 2B may be cut or sectioned along a plane 9 to form two half lenses, e.g., the two half cylindrical lenses 120, 160 depicted in FIG. 2B. It should be understood that the half cylindrical lenses 100 and 140 may be formed in a similar manner, i.e., a pair of half cylindrical lenses formed from a single cylindrical lens. It should also be understood that a pair of half acylindrical lenses and a pair of achromatic lenses may be formed from a single acylindrical lens and a single achromatic lens, respectively, and that forming a pair of half lenses from a single lens may reduce the manufacturing costs of the cloaking devices described herein. Although FIG. 2B depicts sectioning of the cylindrical lens 8 to form two half lenses of equal size (i.e., the length 'l' of the two half cylindrical lenses 120, 160 is equal to 'L/2'), it should be understood that a "half lens" as described herein may not be an exact half of a lens, i.e., the length 'l' of the half lens may be less than or greater than "L/2" of the cylindrical lens 8.

Figure 3B:
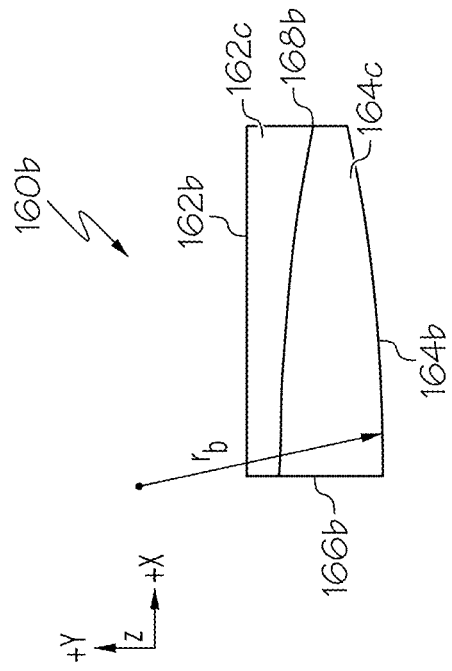
FIG. 3B schematically depicts a top view of a half achromatic lens for a cloaking device according to one or more embodiments disclosed and described herein.
Figure 3A:
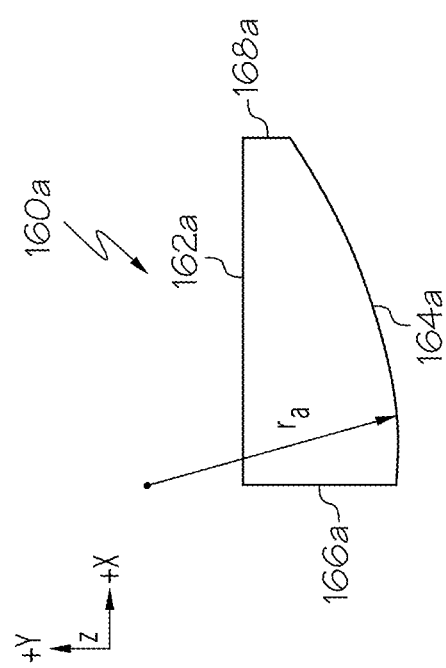
FIG. 3A schematically depicts a top view of a half acylindrical lens for a cloaking device according to one or more embodiments disclosed and described herein.

As noted above, the four half lenses 100, 120, 140, 160 may be half acylindrical lenses or half achromatic lenses. FIG. 3A depicts a top view of the half lens 160 in the form of a half acylindrical lens 160a and FIG. 3B depicts a top view of the half lens in the form of a half achromatic lens 160b. The half acylindrical lens 160a (FIG. 3A) has an inward facing planar surface 162a and an outward facing cylindrical surface 164a with a radius '$r_a$'. The inward facing planar surface 162a and the outward facing cylindrical surface 164a extend between a thick end 166a and a thin end 168a. The half achromatic lens 160b (FIG. 3B) has an inward facing planar surface 162b and an outward facing convex surface 164b with a radius '$r_b$'. The half achromatic lens 160b may be formed from two optical components, e.g., a flint 162c and a crown 164c as depicted in FIG. 3B. The flint 162c comprises the inward facing surface 162b and the crown 164c comprises the outward facing convex surface 164b. The flint 162c is formed from a first transparent material with a first index of refraction and the crown 164c is formed from a second transparent material with a second index of refraction that is different than the first index of refraction. The inward facing surface 162b and the outward facing convex surface 164b extend between a thick end 166b and a thin end 168b. It should be understood that the half acylindrical lens 160a and the half achromatic lens 160b may be formed from a single acylindrical lens and a single achromatic lenses, respectively. That is, an acylindrical lens and an achromatic lens may be cut or sectioned to form a half acylindrical lens and a half achromatic lens, respectively, as discussed above with reference to FIG. 2B.

Referring back to FIG. 1, in embodiments, the thin ends 108, 128, 148, 168 of the four half lenses 100, 120, 140, 160 are positioned proximal or adjacent to a reference optical axis 15 extending from the object-side 12 to the image-side 14. In such embodiments, the thick ends 106, 126, 146, 166 of the four half lenses 100, 120, 140, 160 are positioned distal to or spaced apart from the reference optical axis 15. Although FIG. 1 depicts the thin ends 108, 148 of the object-side half lenses 100, 140, respectively, and the thin ends 128, 168 of the image-side half lenses 120, 160, respectively, positioned in contact with each other, it should be understood that the thin ends 108, 148 and/or thin ends 128, 168 may be spaced apart from each other along the X-axis such that an uncloaked region or gap (not shown) is present between the spaced apart thin ends 108, 148 and/or spaced apart thin ends 128, 168. In such embodiments, an image of the portion of the object O positioned above (+Y direction) the uncloaked region is not provided on the image side 14 of the cloaking assembly 10.

A planar reflection boundary 110 may be positioned between the object-side half lens 100 and the image-side half lens 120 on a right hand side (+X direction) of the reference optical axis 15 and a planar reflection boundary 150 may be positioned between the object-side half lens 140 and the image-side half lens 160 on a left hand side (−X direction) of the reference optical axis 15. In embodiments, the planar reflection boundary 110 extends from the inward facing surface 102 of the object-side half lens 100 to the inward facing surface 122 of the image-side half lens 120, and the planar reflection boundary 150 extends from the inward facing surface 142 of the object-side half lens 140 to the inward facing surface 162 of the image-side half lens 160 as depicted in FIG. 1. In other embodiments, the planar reflection boundary 110 may not extend from the inward facing surface 102 of the object-side half lens 100 to the inward facing surface 122 of the image-side half lens 120, and the planar reflection boundary 150 may not extend from the inward facing surface 142 of the object-side half lens 140 to the inward facing surface 162 of the image-side half lens 160. In such embodiments, the planar reflection boundary 110 and/or the planar reflection boundary 150 may be positioned on a bisecting axis 16 that bisects and extends between the object-side 12 and the image-side 14. That is, the planar reflection boundary 110 may be equally spaced between the inward facing surface 102 of the object-side half lens 100 and the inward facing surface 122 of the image-side half lens 120, and the planar reflection boundary 150 may be equally spaced between the inward facing surface 142 of the object-side half lens 140 and the inward facing surface 162 of the image-side half lens 160. The planar reflection boundary 110 may include an inward facing mirror surface 112 and the planar reflection boundary 150 may include an inward facing mirror surface 152. The inward facing mirror surfaces 112, 152 may be oriented parallel to the reference optical axis 15 and can be made from omnidirectional photonic crystals or mirrors.

The planar reflection boundary 110 is positioned relative to the object-side half lens 100 such that light from an object O (shown as arrow '1' in FIG. 1) incident on the cloaking assembly 10 on the right hand side (+X direction) of the reference optical axis 15 propagates through (shown as arrow '2' in FIG. 1) and is focused by the object-side half lens 100 (shown as arrow '3' in FIG. 1) onto the inward facing mirror surface 112. In embodiments, light 3 is focused by the object-side half lens 100 to a line extending in the Z-direction and intersecting a focal point $f_1$ of the object-side half lens 100 (herein referred to as "focal point $f_1$"). In such embodiments, the inward facing mirror surface 112 may be positioned at the focal point $f_1$. It should be understood that the focal point $f_1$, and other focal points described herein, are provided by the shape of the object-side half lenses described herein. For example, the focal point $f_1$ is due to or provided by the curvature of the outward facing convex surface 104 of the object-side half lens 100. Light 3 is reflected by and diverges from the inward facing mirror surface 112 (shown as arrow '4' in FIG. 1). The image-side half lens 120 is positioned relative to the planar reflection boundary 110 such that light 3 reflected by and diverging from the inward facing mirror surface 112 is incident on the inward facing surface 122. Light 4 propagates through and is focused by the image-side half lens 120 (shown as arrow '5' in FIG. 1) to provide a portion of an Image 'I' on the right hand side of the reference optical axis 15 on the image-side 14 of the cloaking assembly 10.

Light 1 incident on the outward facing convex surface 104 propagates through the object-side half lens 100 as light 2 to the inward facing surface 102. Light 2 is generally focused as light 3 by the object-side half lens 100 to the focal point $f_1$ on the inward facing mirror surface 112 of the planar reflection boundary 110 before being reflected and diverging as light 4 onto the inward facing surface 122 of the image-side half lens 120. Light 5 propagates through the image-side half lens 120 to the outward facing convex surface 124. The image-side half lens 120 focuses light 5 parallel to its original path, i.e., parallel to light 1 (shown as arrow '6' in FIG. 1), to form a right hand side portion (+X direction from reference optical axis 15) of an image 'I' on the image-side 14 of the cloaking assembly 10. Accordingly, light 1 from the object O on the right hand side (+X direction) of the reference optical axis 15 propagates to the image-side to form the image I on the right hand side of the reference optical axis 15 via the optical path: Object-object-side half lens 100—planar reflection boundary 110—mage-side half lens 120—Image. That is, light 1 from the object O on the right hand side (+X direction) of the reference optical axis 15 propagates via the optical path: object O-outward facing convex surface 104 of the object-side half lens 100—inward facing surface 102 of the object-side half lens 100—inward facing mirror surface 112 of the planar reflection boundary 110—inward facing surface 122 of the image-side half lens 120—outward facing convex surface 124 of the image-side half lens 120—image I.

The planar reflection boundary 150 is positioned relative to the object-side half lens 140 such that light 1 from the object O incident on the cloaking assembly 10 on the left hand side (−X direction) of the reference optical axis 15 propagates through (light 2) and is focused by the object-side half lens 140 as light 3 on the inward facing mirror surface 152. In embodiments, light 3 is focused by the object-side half lens 140 to a line extending in the Z-direction and intersecting a focal point $f_2$ of the object-side half lens 140 (herein referred to as "focal point $f_2$"). In such embodiments, the inward facing mirror surface 152 may be positioned at the focal point $f_2$. Light 3 is reflected by and diverges from the inward facing mirror surface 152 as light 4. The image-side half lens 160 is positioned relative to the planar reflection boundary 150 such that light 3 reflected by and diverging from the inward facing mirror surface 152 as light 4 is incident on the inward facing surface 162. Light 4 propagates through (light 5) and is focused by the image-side half lens 160 as light 6 to provide a portion of the Image 'I' on the left hand side of the reference optical axis 15 on the image-side 14 of the cloaking assembly 10.

Light 1 incident on the outward facing convex surface 144 propagates through the object-side half lens 140 as light 2 to the inward facing surface 142. Light 2 is generally focused as light 3 by the object-side half lens 140 to the focal point $f_2$ on the inward facing mirror surface 152 of the planar reflection boundary 150 before being reflected and diverging as light 4 onto the inward facing surface 162 of the image-side half lens 160. Light 5 propagates through the image-side half lens 160 to the outward facing convex surface 164. The image-side half lens 160 focuses light 5 parallel to its original path as light 6 to form a left hand side portion (−X direction from reference optical axis 15) of the image 'I' on the image-side 14 of the cloaking assembly 10. Accordingly, light 1 from the object O on the left hand side (−X direction) of the reference optical axis 15 propagates to the image-side to form the image I on the left hand side of the reference optical axis 15 via the optical path: Object—object-side half lens 140—planar reflection boundary 150—image-side half lens 160—Image. That is, light 1 from the object O on the left hand side (−X direction) of the reference optical axis 15 propagates via the optical path: object O—outward facing convex surface 144 of the object-side half lens 140—inward facing surface 142 of the object-side half lens 140—inward facing mirror surface 152 of the planar reflection boundary 150—inward facing surface 162 of the image-side half lens 160—outward facing convex surface 164 of the image-side half lens 160—image I.

In combination, i.e., light 1 on the right hand side (+X direction) and left hand side (−X direction) of the reference optical axis 15 from the object O on the object—side 12 of the cloaking assembly 10 propagates to the image-side 14 via the optical path: Object—object-side half lenses 100, 140—planar reflection boundaries 110, 150—image-side half lenses 120, 160—Image. That is, light 1 from the object O propagates via the optical path: object O—outward facing convex surfaces 104, 144 of the object-side half lenses 100, 140, respectively—inward facing surfaces 102, 142 of the object-side half lenses 100, 140, respectively—inward facing mirror surfaces 112, 152 of the planar reflection boundaries 110, 150, respectively—inward facing surfaces 122, 162 of the image-side half lenses 120, 160, respectively—outward facing convex surfaces 124, 164 of the image-side half lenses 120, 160, respectively—image I.

Figure 4:
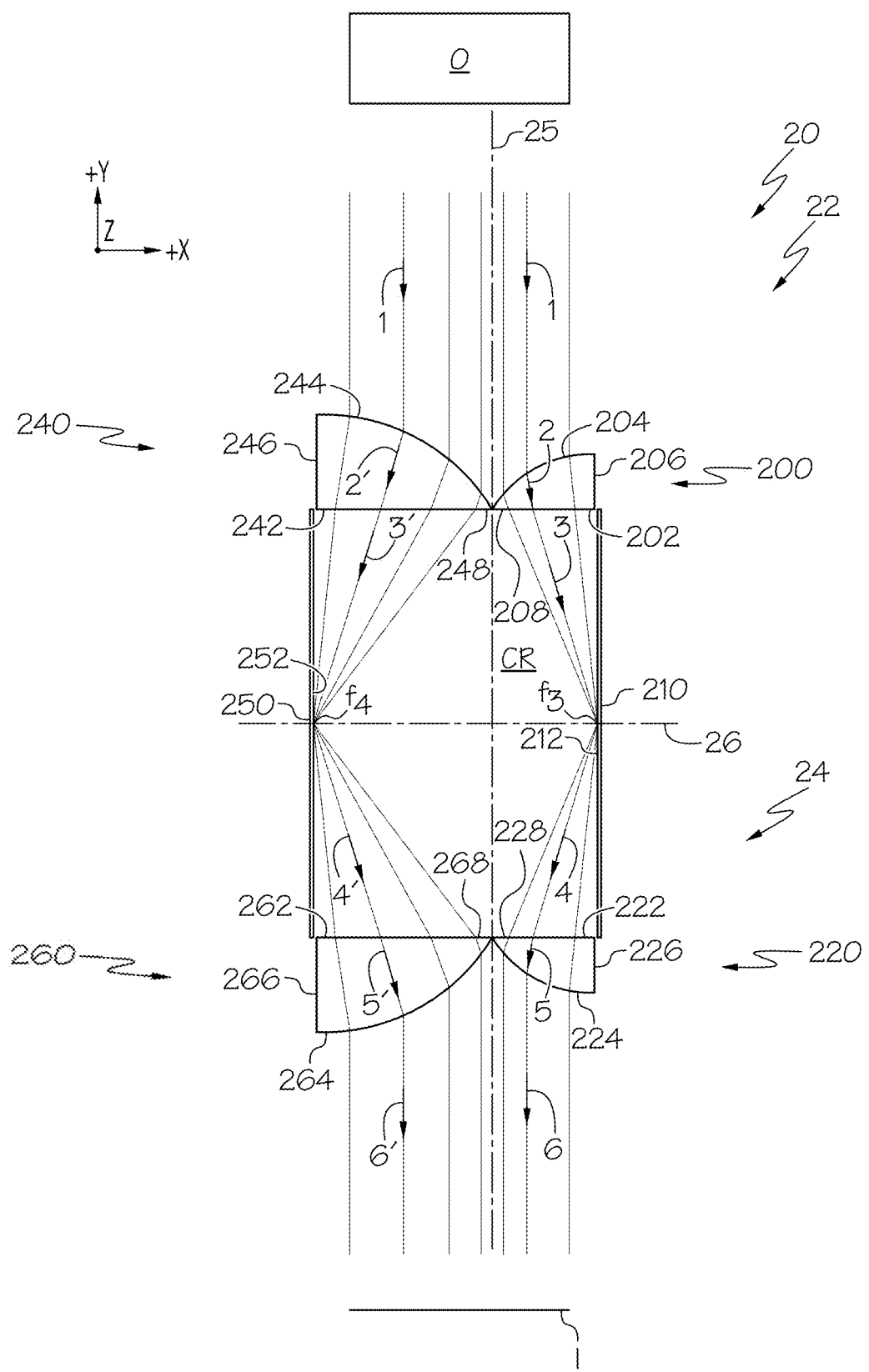
FIG. 4 schematically depicts a top view of a cloaking device according to one or more embodiments disclosed and described herein.

Although FIG. 1 depicts the four half lenses 100, 120, 140, 160 being of the same size, i.e., the lengths of the inward facing surfaces 102, 122, 142, 162 are equal and the thicknesses of the thick ends 106, 126, 146, 166 are equal, in some embodiments, the four half lenses 100, 120, 140, 160 are not the same size. Particularly, FIG. 4 depicts a cloaking assembly 20 with half lenses of different sizes. The cloaking assembly 20 includes an object-side 22, an image-side 24, and four half lenses 200, 220, 240, 260. The two half lenses 200, 220 on the right hand side (+X direction) of a reference optical axis 25 are smaller than the two half lenses 240, 260 on the left hand side (−X direction) of the reference optical axis 25 as discussed in greater detail below. A cloaked region CR is positioned between the half lenses 200, 240 and the half lenses 220, 260. Each of the four half lenses 200, 220, 240, 260 have a length along the X-axis, a thickness along the Y-axis and a height along the Z-axis shown in the figures. The two half lenses 200, 240 may be positioned on the object-side 22 of the cloaking assembly 20 to face an object 'O' and may be referred to herein as object-side half lenses 200, 240. The two half lenses 220, 260 may be positioned on the image-side 24 of the cloaking assembly 20 to provide an image 'I' formed by the cloaking assembly 20 and may be referred to herein as image-side half lenses 220, 260.

The half lenses 200, 220, 240, 260 each have an inward facing surface 202, 222, 242, 262 and an outward facing convex surface 204, 224, 244, 264, respectively. Also, the half lenses 200, 220, 240, 260 each have a thick end 206, 226, 246, 266 and a thin end 208, 228, 248, 268, respectively. The inward facing surfaces 202, 222, 242, 262 and the outward facing convex surfaces 204, 224, 244, 264 extend between the thick ends 206, 226, 246 266 and the thin ends 208, 228, 248, 268, respectively.

As depicted in FIG. 4, the inward facing surface 202 of the object-side half lens 200 may have a length (X-direction) that is less than a length of the inward facing surface 242 of the object-side half lens 240 and the inward facing surface 222 of the image-side half lens 220 may have a length that is less than a length of the inward facing surface 262 of the image-side half lens 260. In the alternative, or in addition to, the thick end 206 of the object-side half lens 200 may have a thickness (Y direction) that is less than a thickness of the thick end 246 of the object-side half lens 240 and the thick end 226 of the image-side half lens 220 may have a thickness that is less than a thickness of the thick end 266 of the image-side half lens 260. In embodiments, the half lenses 200, 220, 240, 260 are half cylindrical lenses 200, 220, 240, 260 (FIG. 2A). In other embodiments, the half lenses 200, 220, 240, 260 are half acylindrical lenses 200, 220, 240, 260 (FIG. 3A). In still other embodiments, the half lenses 200, 220, 240, 260 are half achromatic lenses 200, 220, 240, 260 (FIG. 3B). Also, it should be understood that the half lenses 200, 220, 240, 260 may be a combination of half cylindrical lenses, half acylindrical lenses and/or half achromatic lenses. That is, one or more of the half lenses 200, 220, 240, 260 may be a half cylindrical lens, a half acylindrical lens or a half achromatic lens.

In embodiments, the thin ends 208, 228, 248, 268 are positioned proximal or adjacent to a reference optical axis 25 extending from the object-side 22 to the image-side 24. In such embodiments, the thick ends 206, 226, 246, 266 are positioned distal to or spaced apart from the reference optical axis 25. Although FIG. 4 depicts the thin ends 208, 248 of the object-side half lens 200, 240, respectively, and the thin ends 228, 268 of the image-side half lenses 220, 260, respectively, positioned in contact with each other, it should be understood that the thin ends 208, 248 and/or thin ends 228, 268 may be spaced apart from each other along the X-axis such that an uncloaked region or gap (not shown) is present between the spaced apart thin ends 208, 248 and/or spaced apart thin ends 228, 268. In such embodiments, an image of the portion of the object O positioned above (+Y direction) the uncloaked region is not provided on the image side 24 of the cloaking assembly 20.

A planar reflection boundary 210 may be positioned between the object-side half lens 200 and the image-side half lens 220 on a right hand side (+X direction) of the reference optical axis 25 and a planar reflection boundary 250 may be positioned between the object-side half lens 240 and the image-side half lens 260 on a left hand side (−X direction) of the reference optical axis 25. In embodiments, the planar reflection boundary 210 extends from the inward facing surface 202 of the object-side half lens 200 to the inward facing surface 222 of the image-side half lens 220, and the planar reflection boundary 250 extends from the inward facing surface 242 of the object-side half lens 240 to the inward facing surface 262 of the image-side half lens 260 as depicted in FIG. 4. In other embodiments, the planar reflection boundary 210 may not extend from the inward facing surface 202 of the object-side half lens 200 to the inward facing surface 222 of the image-side half lens 220, and the planar reflection boundary 250 may not extend from the inward facing surface 242 of the object-side half lens 240 to the inward facing surface 262 of the image-side half lens 260. In such embodiments, the planar reflection boundary 210 and/or the planar reflection boundary 250 may be positioned on a bisecting axis 26 that bisects and extends between the object-side 22 and the image-side 24. That is, the planar reflection boundary 210 may be equally spaced between the inward facing surface 202 of the object-side half lens 200 and the inward facing surface 222 of the image-side half lens 220, and the planar reflection boundary 250 may be equally spaced between the inward facing surface 242 of the object-side half lens 240 and the inward facing surface 262 of the image-side half lens 260. The planar reflection boundary 210 may include an inward facing mirror surface 212 and the planar reflection boundary 250 may include an inward facing mirror surface 252. The inward facing mirror surfaces 212, 252 may be oriented parallel to the reference optical axis 25 and can be made from omnidirectional photonic crystals or mirrors.

The planar reflection boundary 210 is positioned relative to the object-side half lens 200 such that light from an object O (shown as arrow '1' in FIG. 4) incident on the cloaking assembly 20 on the right hand side (+X direction) of the reference optical axis 25 propagates through (shown as arrow '2' in FIG. 4) and is focused by the object-side half lens 200 (shown as arrow '3' in FIG. 4) onto the inward facing mirror surface 212. In embodiments, light 3 is focused by the object-side half lens 200 to a line extending in the Z-direction and intersecting a focal point $f_3$ of the object-side half lens 200 (herein referred to as "focal point $f_3$"). In such embodiments, the inward facing mirror surface 212 may be positioned at the focal point $f_3$. Light 3 is reflected by and diverges from the inward facing mirror surface 212 (shown as arrow '4' in FIG. 4). The image-side half lens 220 is positioned relative to the planar reflection boundary 210 such that light 3 reflected by and diverging from the inward facing mirror surface 212 is incident on the inward facing surface 222. Light 4 propagates through (shown as arrow '5' in FIG. 4) and is focused by the image-side half lens 220 (shown as arrow '6' in FIG. 4) to provide a portion of an Image 'I' on the right hand side of the reference optical axis 25 on the image-side 24 of the cloaking assembly 20.

Light 1 incident on the outward facing convex surface 204 propagates through the object-side half lens 200 as light 2 to the inward facing surface 202. Light 2 is generally focused as light 3 by the object-side half lens 200 to the focal point $f_3$ on the inward facing mirror surface 212 of the planar reflection boundary 210 before being reflected and diverging as light 4 onto the inward facing surface 222 of the image-side half lens 220. Light 5 propagates through the image-side half lens 220 to the outward facing convex surface 224. The image-side half lens 220 focuses light 5 parallel to its original path, i.e., parallel to light 1 (shown as arrow '6' in FIG. 4), to form a right hand side portion (+X direction from reference optical axis 25) of an image 'I' on the image-side 24 of the cloaking assembly 20. Accordingly, light 1 from the object O on the right hand side (+X direction) of the reference optical axis 25 propagates to the image-side to form the image I on the right hand side of the reference optical axis 25 via the optical path: Object—object-side half lens 200-planar reflection boundary 210—image-side half lens 220—Image. That is, light 1 from the object O on the right hand side (+X direction) of the reference optical axis 25 propagates via the optical path: object O-outward facing convex surface 204 of the object-side half lens 200-inward facing surface 202 of the object-side half lens 200—inward facing mirror surface 212 of the planar reflection boundary 210—inward facing surface 222 of the image-side half lens 220—outward facing convex surface 224 of the image-side half lens 220—image I.

The planar reflection boundary 250 is positioned relative to the object-side half lens 240 such that light 1 from the object O incident on the cloaking assembly 20 on the left hand side (−X direction) of the reference optical axis 25 propagates through (light 2') and is focused by the object-side half lens 240 as light 3' onto the inward facing mirror surface 252. In embodiments, light 3' is focused by the object-side half lens 240 to a line extending in the Z-direction and intersecting a focal point $f_4$ of the object-side half lens 240 (herein referred to as "focal point $f_4$"). In such embodiments, the inward facing mirror surface 252 may be positioned at the focal point $f_4$. Light 3' is reflected by and diverges from the inward facing mirror surface 252 as light 4'. The image-side half lens 260 is positioned relative to the planar reflection boundary 250 such that light 3' reflected by and diverging from the inward facing mirror surface 252 as light 4' is incident on the inward facing surface 262. Light 4' propagates through (light 5') and is focused by the image-side half lens 260 as light 6' to provide a portion of the Image 'I' on the left hand side of the reference optical axis 25 on the image-side 24 of the cloaking assembly 20.

Light 1 incident on the outward facing convex surface 244 propagates through the object-side half lens 240 as light 2' to the inward facing surface 242. Light 2' is generally focused as light 3' by the object-side half lens 240 to the focal point $f_4$ on the inward facing mirror surface 252 of the planar reflection boundary 250 before being reflected as diverging light 4' onto the inward facing surface 262 of the image-side half lens 260. Light 5' propagates through the image-side half lens 260 to the outward facing convex surface 264. The image-side half lens 260 focuses light 5' parallel to its original path as light 6' to form a left hand side portion (−X direction from reference optical axis 25) of the image 'I' on the image-side 24 of the cloaking assembly 20. Accordingly, light 1 from the object O on the left hand side (−X direction) of the reference optical axis 25 propagates to the image-side to form the image I on the left hand side of the reference optical axis 25 via the optical path: Object—object-side half lens 240—planar reflection boundary 250— image-side half lens 260—Image. That is, light 1 from the object O on the left hand side (−X direction) of the reference optical axis 25 propagates via the optical path: object O—outward facing convex surface 244 of the object-side half lens 240—inward facing surface 242 of the object-side half lens 240—inward facing mirror surface 252 of the planar reflection boundary 250—inward facing surface 262 of the image-side half lens 260—outward facing convex surface 264 of the image-side half lens 260—image I.

In combination, i.e., light 1 on the right hand side (+X direction) and left hand side (−X direction) of the reference optical axis 25 from the object O on the object-side 22 of the cloaking assembly 20 propagates to the image-side 24 via the optical path: Object—object-side half lenses 200, 240— planar reflection boundaries 210, 250—image-side half lenses 220, 260—Image. That is, light 1 from the object O propagates via the optical path: object O—outward facing convex surfaces 204, 244 of the object-side half lenses 200, 240, respectively—inward facing surfaces 202, 242 of the object-side half lenses 200, 240, respectively—inward facing mirror surfaces 212, 252 of the planar reflection boundaries 210, 250, respectively—inward facing surfaces 222, 262 of the image-side half lenses 220, 260, respectively— outward facing convex surfaces 224, 264 of the image-side half lenses 220, 260, respectively—image I.

Figure 5:
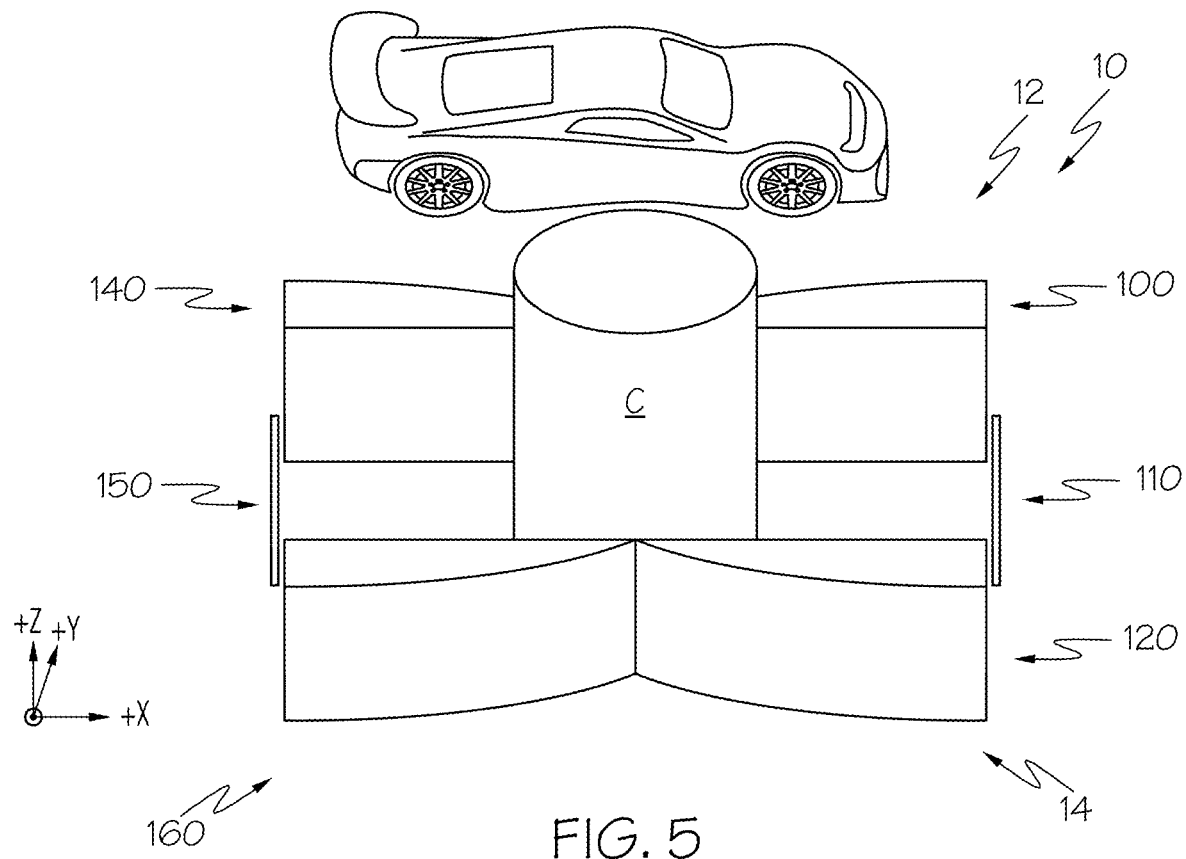
FIG. 5 schematically depicts a top perspective view of the cloaking device of FIG. 1 with a first object on one side of the cloaking device and a second object within the cloaked region of the cloaking device according to one or more embodiments disclosed and described herein.
Figure 6:
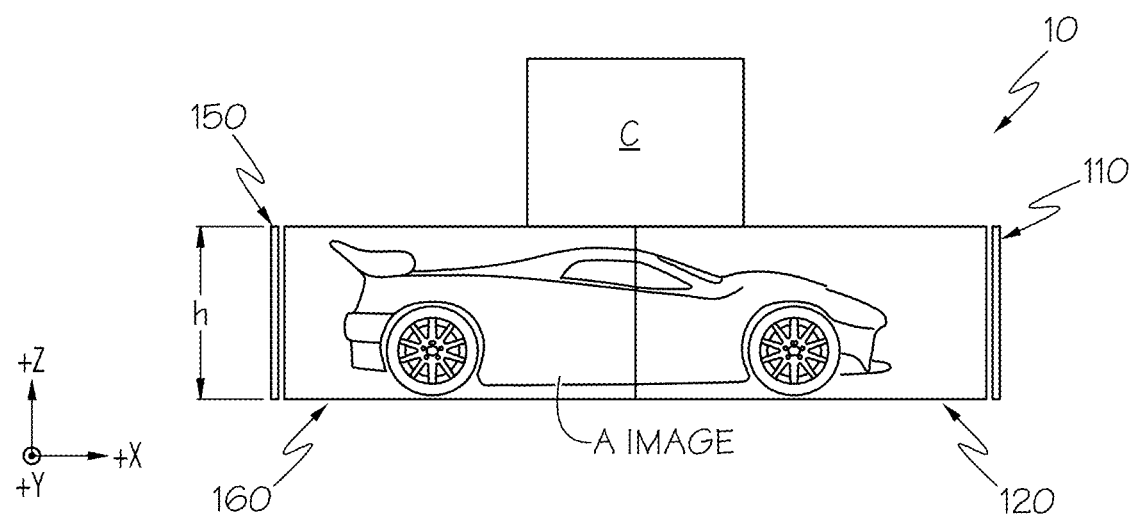
FIG. 6 schematically depicts a side view of the cloaking device of FIG. 1 with the first object on one side of the cloaking device and the second object within the cloaked region of the cloaking device.

Referring now to FIGS. 1, 5 and 6, a top perspective view and a side view of a cloaking device according to embodiments as discussed with respect to FIG. 1 are shown in FIGS. 5 and 6, respectively. Specifically, FIG. 5 is a top perspective view of an article in the form of a column 'C' within the cloaked region CR of the cloaking assembly 10 and an automobile 'A' located behind the column C on the object-side 12 of the cloaking assembly 10 in the +Y direction. The column C has a height dimension in the Z direction (increasing height in the +Z direction) greater than the height h of the cloaking device (FIG. 6). FIG. 6 is a side view from the +Y direction of the cloaking assembly 10 shown in FIG. 1 and shows the portion of the column C that is within the cloaked region is not visible and the automobile A located behind the column C in the +Y direction is visible to an observer viewing the cloaking assembly 10 in the +Y direction. Accordingly, the column C positioned within the cloaked region is not visible to an observer viewing the image-side 14 of the cloaking assembly 10 and an image of the automobile A is visible to the observer viewing the image-side 14. Although column C in FIGS. 5 and 6 is separate from the inward facing surfaces (e.g., inward facing surfaces 102, 122, 142, 162 of cloaking assembly 10), i.e., column C is a separate object from the cloaking assembly 10, it should be appreciated that column C may be structurally part of cloaking assembly 10 and have an outer surface that provides or is equivalent to the inward facing surfaces of the half lenses.

Figure 7:
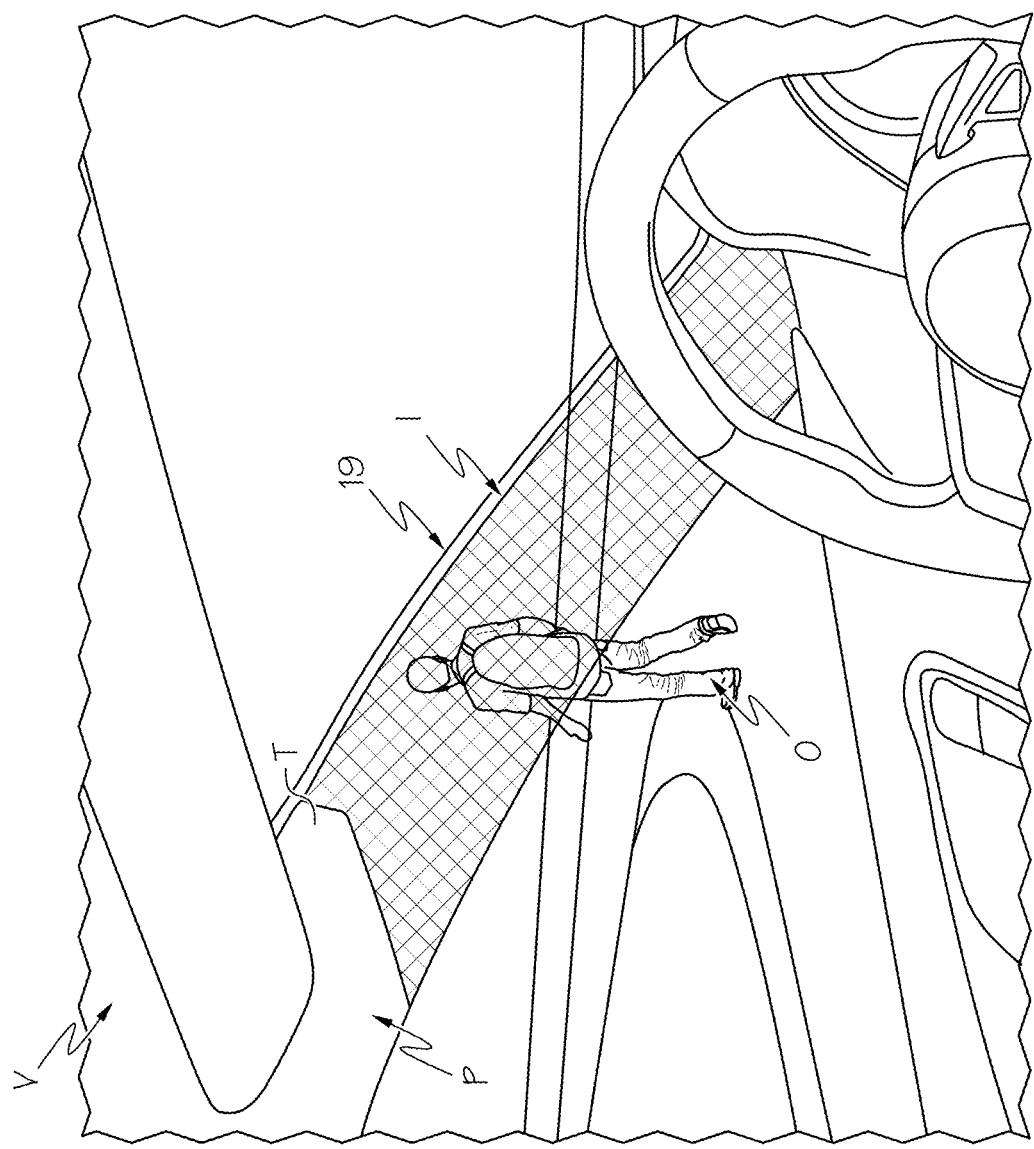
FIG. 7 schematically depicts a cloaking device cloaking a vehicle A-pillar of a vehicle according to one or more embodiments described and illustrated herein.

Referring to FIG. 7, embodiments of an A-pillar of a vehicle being cloaked by a cloaking device are shown. Particularly, FIG. 7 shows a cloaking device 19 as described herein cloaking a portion of an A-pillar P of a vehicle V. A portion of the A-pillar P is positioned within a cloaked region (not shown) of the cloaking device 19 and a portion of the A-pillar P extends beyond the cloaking device and is covered with trim T. Illustrated outside of the vehicle V on the object-side of the cloaking device 19 is a target object 'O' in the form of pedestrian. A portion of the pedestrian O is visible through a side window of the vehicle V and a portion of the pedestrian is visible "through" the A-pillar P cloaked by the cloaking device 19. The cloaking device 19 redirects light reflected from the pedestrian O around the A-pillar P positioned within the cloaked region of the cloaking device 19 and forms an image I of the pedestrian O in the interior of the vehicle on the image-side of the cloaking device 19 that is visible to an occupant of the vehicle V looking towards the pedestrian O. Accordingly, light from the pedestrian O appears to pass through the A-pillar P and a blind spot typically created by the A-pillar P is not as present as when the portion of the A-pillar P is not positioned within the cloaked region of the cloaking device 19. In embodiments, the A-pillar P itself serves as the cloaked region, i.e. the A-pillar P has an outer surface with one or more inward facing surfaces that assist in redirecting light from the pedestrian) around the A-pillar P. It should be appreciated that cloaking of the A-pillar P with the cloaking device 19 and bypassing the blind spot produced by the A-pillar P is performed without the use of metamaterials, video images, cameras, sophisticated electronics, etc.

EXAMPLES

Figure 8A:
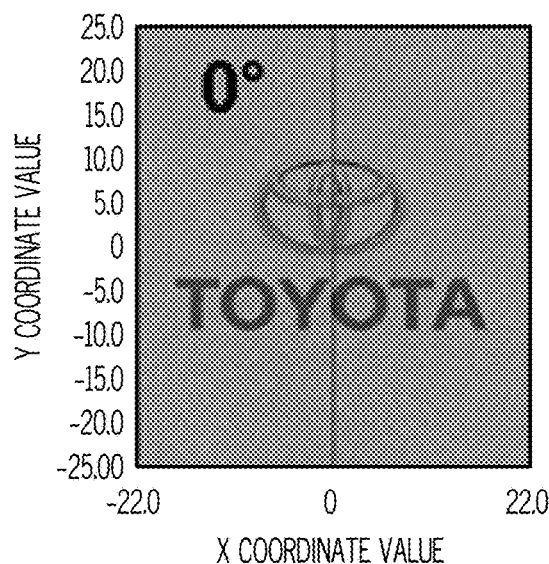
FIG. 8A depicts a computer simulated cloaking image for a cloaking assembly according to the embodiments of FIG. 1 with a 0° misalignment between a reference optical axis and a viewing angle of the cloaking assembly.
Figure 8B:
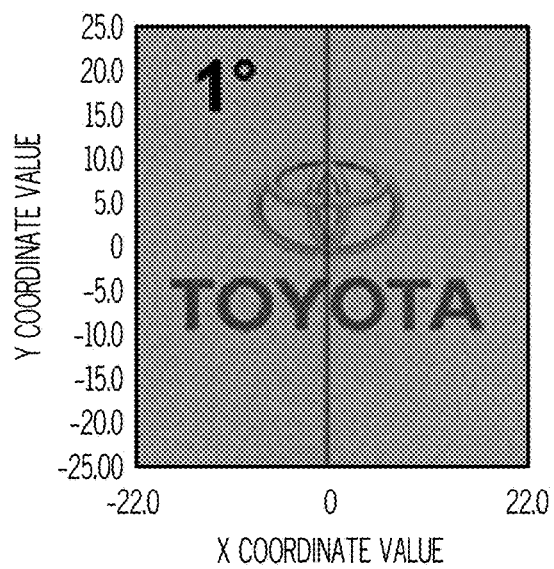
FIG. 8B depicts a computer simulated cloaking image for a cloaking assembly according to the embodiments of FIG. 1 with a 1° misalignment between a reference optical axis and a viewing angle of the cloaking assembly.
Figure 8C:
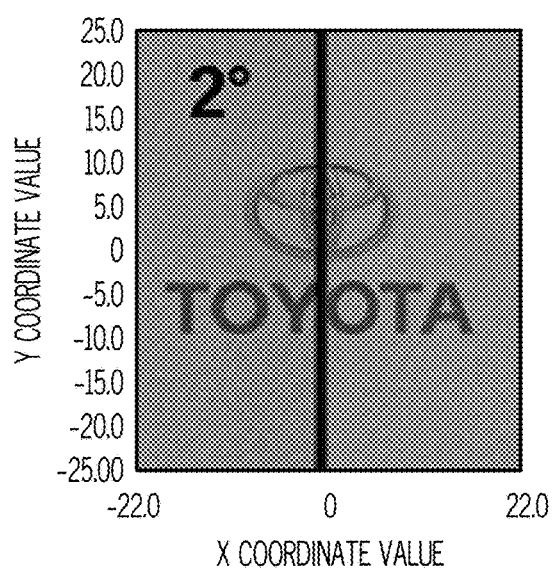
FIG. 8C depicts a computer simulated cloaking image for a cloaking assembly according to the embodiments of FIG. 1 with a 2° misalignment between a reference optical axis and a viewing angle of the cloaking assembly.
Figure 8D:
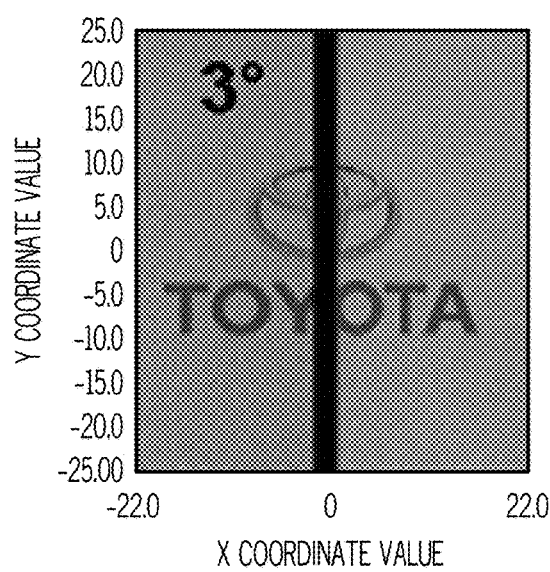
FIG. 8D depicts a computer simulated cloaking image for a cloaking assembly according to the embodiments of FIG. 1 with a 3° misalignment between a reference optical axis and a viewing angle of the cloaking assembly.
Figure 8E:
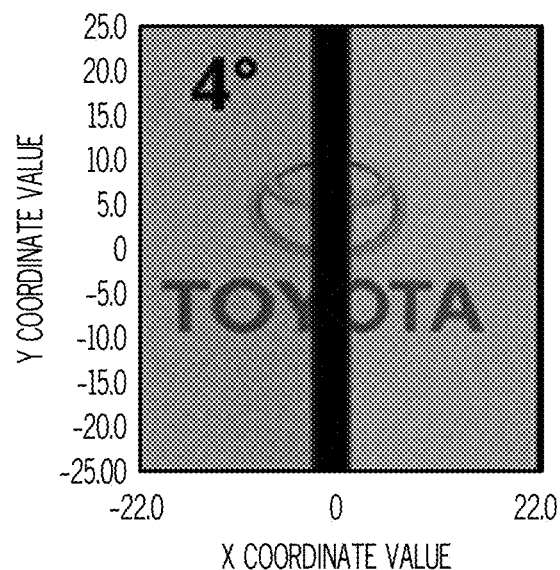
FIG. 8E depicts a computer simulated cloaking image for a cloaking assembly according to the embodiments of FIG. 1 with a 4° misalignment between a reference optical axis and a viewing angle of the cloaking assembly.
Figure 8F:
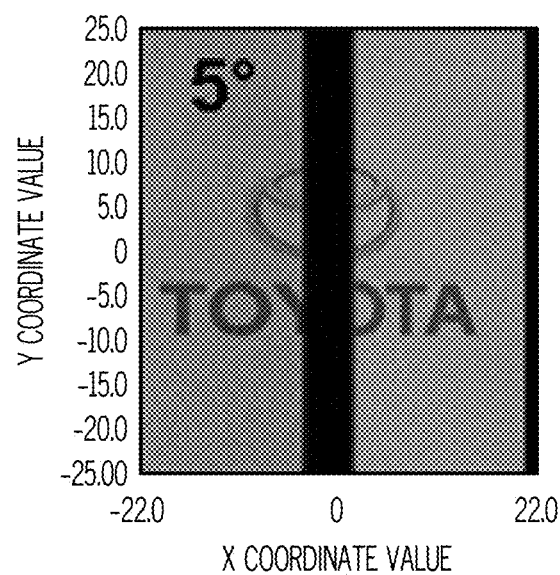
FIG. 8F depicts a computer simulated cloaking image for a cloaking assembly according to the embodiments of FIG. 1 with a 5° misalignment between a reference optical axis and a viewing angle of the cloaking assembly.

Referring now to FIGS. 8A-8F, images of an object in the form of an emblem positioned on the object-side 12 of the cloaking assembly 10 and as viewed from the image-side 14 simulated using a commercial software program (Zemax OpticStudio) are depicted. The object-side half lenses 100, 140 and image-side half lenses 120, 160 were half lenses of commercial AYL5040-A acylindrical lenses from Thorlabs. The object-side half lenses 100, 140 and image-side half lenses 120, 160 had a focal length of 40 mm, a height h of 50 mm and length l of 50 mm. The outward facing convex surfaces 104, 124, 144, 164 were coated with an anti-reflection coating. The aspect ratios for the entire device area and the hidden region were 0.60 and 0.83, respectively, with a cloaking ratio (i.e., hidden area/total device area) of about 36%. FIG. 8A depicts an image of the object with no misalignment (0°) between the reference optical axis 15 and a viewing angle of the cloaking assembly 10 from the +Y direction. That is, as used herein, the term misalignment refers to an angle defined by the reference optical axis of a cloaking assembly and a line of sight of an observer viewing the cloaking assembly from the image-side as depicted by the +Y direction in the figures (also referred to herein as a "viewing angle"). FIG. 8B depicts an image of the object with a 1° misalignment between the reference optical axis 15 and a viewing angle of the cloaking assembly 10. FIG. 8C depicts an image of the object with a 2° misalignment between the reference optical axis 15 and a viewing angle of the cloaking assembly 10. FIG. 8D depicts an image of the object with a 3° misalignment between the reference optical axis 15 and a viewing angle of the cloaking assembly 10. FIG. 8E depicts an image of the object with a 4° misalignment between the reference optical axis 15 and a viewing angle of the cloaking assembly 10. FIG. 8F depicts an image of the object with a 5° misalignment between the reference optical axis 15 and a viewing angle of the cloaking assembly 10. As shown by the images in FIGS. 8A-8F, an image of an object on the object-side 12 of the cloaking assembly 10 can be seen clearly with up to 5° misalignment.

The cloaking devices described herein may be used to cloak vehicle articles when viewed from within the vehicle, such as a vehicle A-pillar, B-pillar, C-pillar, D-pillar, etc., and bypass a blind spot caused by the vehicle article. The terms "object," "article," and "item" may interchangeably refer to a visual object or image (2D or 3D) that reflects light or transmits light and the term "light from" may refer to "light reflected from" or "light transmitted from." The terms "generally," "approximately," and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Although the embodiments disclosed and described in the figures depict a cloaking assembly with a cloaked region bounded by four half lenses and two planar reflection boundaries, cloaking assemblies with a cloaked region bounded by two half lenses and one planar reflection boundary are provided. For example and without limitation, a cloaked region may be bounded between an object-side half lens, a planar reflection boundary and an image-side curved CR boundary.

Directional terms as used herein—for example up, down, right, left, front, back, top, bottom, vertical, horizontal—are made only with reference to the figures as drawn and are not intended to imply absolute orientation unless otherwise expressly stated.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
   an object-side, an image-side, a cloaked region between the object-side and the image-side, and a reference optical axis extending from the object-side to the image-side;
   an object-side half lens and an image-side half lens, the object-side half lens and the image-side half lens each comprising an inward facing surface, an outward facing convex surface, a thick end and a thin end, wherein the inward facing surface and the outward facing convex surface extend between the thick end and the thin end;
   a planar reflection boundary positioned between the object-side half lens and the image-side half lens, the planar reflection boundary comprising an inward facing mirror surface oriented parallel with the reference optical axis,
   wherein light from an object positioned on the object-side of the cloaking device and obscured by the cloaked region is redirected around the cloaked region by the object-side half lens, planar reflection boundary and image-side half lens to form an image of the object on the image-side of the cloaking device such that the light from the object appears to pass through the cloaked region.

2. The cloaking device of claim 1, wherein the thin ends of the object-side and image-side half lenses are positioned proximal to the reference optical axis and the thick ends of the object-side and image-side half lenses are positioned distal to the reference optical axis.

3. The cloaking device of claim 1, wherein the inward facing mirror surface of the planar reflection boundary is positioned at a focal point of the object-side half lens.

4. The cloaking device of claim 1, wherein the object-side half lens is oriented to focus light from the object positioned on the object-side of the cloaking device onto the inward facing mirror surface of the planar reflection boundary, the inward facing mirror surface of the planar reflection boundary is oriented to reflect light from the object-side half lens to the image-side half lens, wherein the light reflected from the inward facing mirror surface of the planar reflection boundary is diverging light, and the image-side half lens is oriented to focus the diverging light from the inward facing mirror surface of the planar reflection boundary to form the image of the object on the image-side of the cloaking device.

5. The cloaking device of claim 1, wherein the object-side half lens and the image-side half lens are selected from the group consisting of cylindrical half lenses, acylindrical half lenses and achromatic half lenses.

6. The cloaking device of claim 1, wherein:
   the object-side half lens comprises a pair of object-side half lenses with one of the pair of object-side half lenses positioned on one side of the reference optical axis and another of the pair of object-side half lenses positioned on another side of the reference optical axis;
   each of the pair of object-side half lenses comprises an inward facing surface, an outward facing convex surface, a thick end and a thin end side, the inward facing surface and the outward facing convex surface extending between the thick end and the thin end;
   the thin end of each of the pair of object-side half lenses is positioned proximal to the reference optical axis and the thick end of each of the pair of object-side half lenses is positioned distal to the reference optical axis;
   the image-side half lens comprises a pair of image-side half lenses with one of the pair of image-side half lenses positioned on one side of the reference optical axis and another of the pair of image-side half lenses positioned on another side of the reference optical axis;
   each of the pair of image-side half lenses comprises an inward facing surface, an outward facing convex surface, a thick end and a thin end, the inward facing surface and the outward facing convex surface extending between the thick end and the thin end;
   the thin end of each of the pair of image-side half lenses is positioned proximal to the reference optical axis and the thick end of each of the pair of image-side half lenses is positioned distal to the reference optical axis;
   the planar reflection boundary comprises a pair of planar reflection boundaries with one of the pair of planar reflection boundaries positioned between the object-side half lens and the image-side half lens positioned on the one side of the reference optical axis and another of the pair of planar reflection boundaries positioned between the object-side half lens and the image-side half lens positioned on the another side of the reference optical axis;
   each of the pair of planar reflection boundaries comprises an inward facing mirror surface oriented parallel with the reference optical axis;
   the light from the object positioned on the object-side of the cloaking device and obscured by the cloaked region is redirected around the cloaked region by the pair of object-side half lenses, pair of planar reflection boundaries and pair of image-side half lenses to form the image of the object on the image-side of the cloaking device such that the light from the object appears to pass through the cloaked region.

7. The cloaking device of claim 6, wherein thicknesses of the thick ends of the pair of object-side half lenses are equal.

8. The cloaking device of claim 6, wherein thicknesses of the thick ends of the pair of object-side half lenses are not equal.

9. A cloaking device assembly comprising:
   an object-side, an image-side, a cloaked region, a cloaked article positioned within the cloaked region, and a reference optical axis extending from the object-side to the image-side;
   a pair of object-side half lenses, each of the pair of object-side half lenses comprising an inward facing surface and an outward facing convex surface, wherein one of the pair of object-side half lenses is positioned on one side of the reference optical axis and another of the pair of object-side half lenses is positioned on another side of the reference optical axis;
   a pair of image-side half lenses, each of the pair of image-side half lenses comprising an inward facing surface and an outward facing convex surface, wherein one of the pair of image-side half lenses is positioned on one side of the reference optical axis and another of the pair of image-side half lenses is positioned on another side of the reference optical axis;
   a pair of planar reflection boundaries, each of the pair of planar reflection boundaries comprising an inward facing mirror surface oriented parallel to the reference optical axis, wherein one of the pair of planar reflection boundaries is positioned between the object-side half lens and the image-side half lens positioned on the one side of the reference optical axis and another of the pair of planar reflection boundaries is positioned between the object-side half lens and the image-side half lens positioned on the another side of the reference optical axis;
   wherein:
      the pair of object-side half lenses and the pair of image-side half lenses are selected from the group consisting of cylindrical half lenses, acylindrical half lenses and achromatic half lenses;
      light from an object positioned on the object-side of the cloaking device assembly and obscured by the cloaked region is redirected around the cloaked article by the pair of object-side half lenses, pair of planar reflection boundaries and pair of image-side half lenses to form an image of the object on the image-side of the cloaking device assembly such that the light from the object appears to pass through the cloaked article.

10. The cloaking device assembly of claim 9, wherein each of the pair of object-side half lenses and each of the pair of image-side half lenses comprise a thick end and a thin end, wherein the inward facing surface and the outward facing convex surface of each of the pair of object-side half lenses and each of the pair of image-side half lenses extend between the thick end and the thin end.

11. The cloaking device assembly of claim 10, wherein the thin end of each of the pair of object-side half lenses and each of the pair of image-side half lenses is positioned proximal to the reference optical axis and each of the thick ends is positioned distal to the reference optical axis.

12. The cloaking device assembly claim 10, wherein thicknesses of the thick end of each of the pair of object-side half lenses are equal and thicknesses of the thick end of each of the pair of image-side half lenses are equal.

13. The cloaking device assembly claim 10, wherein thicknesses of the thick end of each of the pair of object-side half lenses are not equal and thicknesses of the thick end of each of the pair of image-side half lenses are not equal.

14. The cloaking device assembly of claim 9, wherein the pair of inward facing mirror surfaces of the pair of planar reflection boundaries are positioned at focal points of the pair of image-side half lenses.

15. The cloaking device assembly of claim 9, wherein the light from the object positioned on the object-side of the cloaking device propagates to the image-side to form the image via the optical path: object—outward facing convex surfaces of the pair of object-side half lenses—inward facing surfaces of the pair of object-side half lenses-inward facing mirror surfaces of the pair of planar reflection boundaries-inward facing surfaces of the pair of image-side half lenses—outward facing convex surfaces of the pair of image-side half lenses-image.

16. A vehicle comprising:

an A-pillar; and a cloaking device positioned on the A-pillar, the cloaking device comprising:

an object-side, an image-side, a cloaked region and a reference optical axis extending from the object-side to the image-side, wherein the A-pillar is positioned within the cloaked region, the object-side is positioned on an exterior of the vehicle and the image-side is positioned within an interior of the vehicle;

an object-side half lens and an image-side half lens, the object-side half lens and the image-side half lens each comprising an inward facing surface, an outward facing convex surface, a thick end and a thin end, wherein the inward facing surface and the outward facing convex surface extend between the thick end and the thin end;

a planar reflection boundary positioned between the object-side half lens and the image-side half lens, the planar reflection boundary comprising an inward facing mirror surface oriented parallel with the reference optical axis, wherein light from an object positioned on the object-side of the cloaking device and obscured by the cloaked region is redirected around the A-pillar via propagation of the light through the object-side half lens onto the planar reflection boundary, reflection of the light from object-side half lens by the planar reflection boundary onto the image-side half lens and propagation of the light from the planar reflection boundary through the image-side half lens to form an image of the object on the image-side of the cloaking device such that the light from the object appears to pass through the cloaked region.

17. The vehicle of claim 16, wherein the thin ends of the object-side and image-side half lenses are positioned proximal to the reference optical axis and the thick ends of the object-side and image-side half lenses are positioned distal to the reference optical axis.

18. The vehicle of claim 16, wherein the inward facing mirror surface of the planar reflection boundary is positioned at a focal point of the object-side half lens.

19. The vehicle of claim 16, wherein a thickness of the thick end of the object-side half lens is equal to a thickness of the thick end of the image-side half lens.

20. The vehicle of claim 16, wherein a thickness of the thick end of the object-side half lens is not equal to a thickness of the thick end of the image-side half lens.

* * * * *